Figure 1:
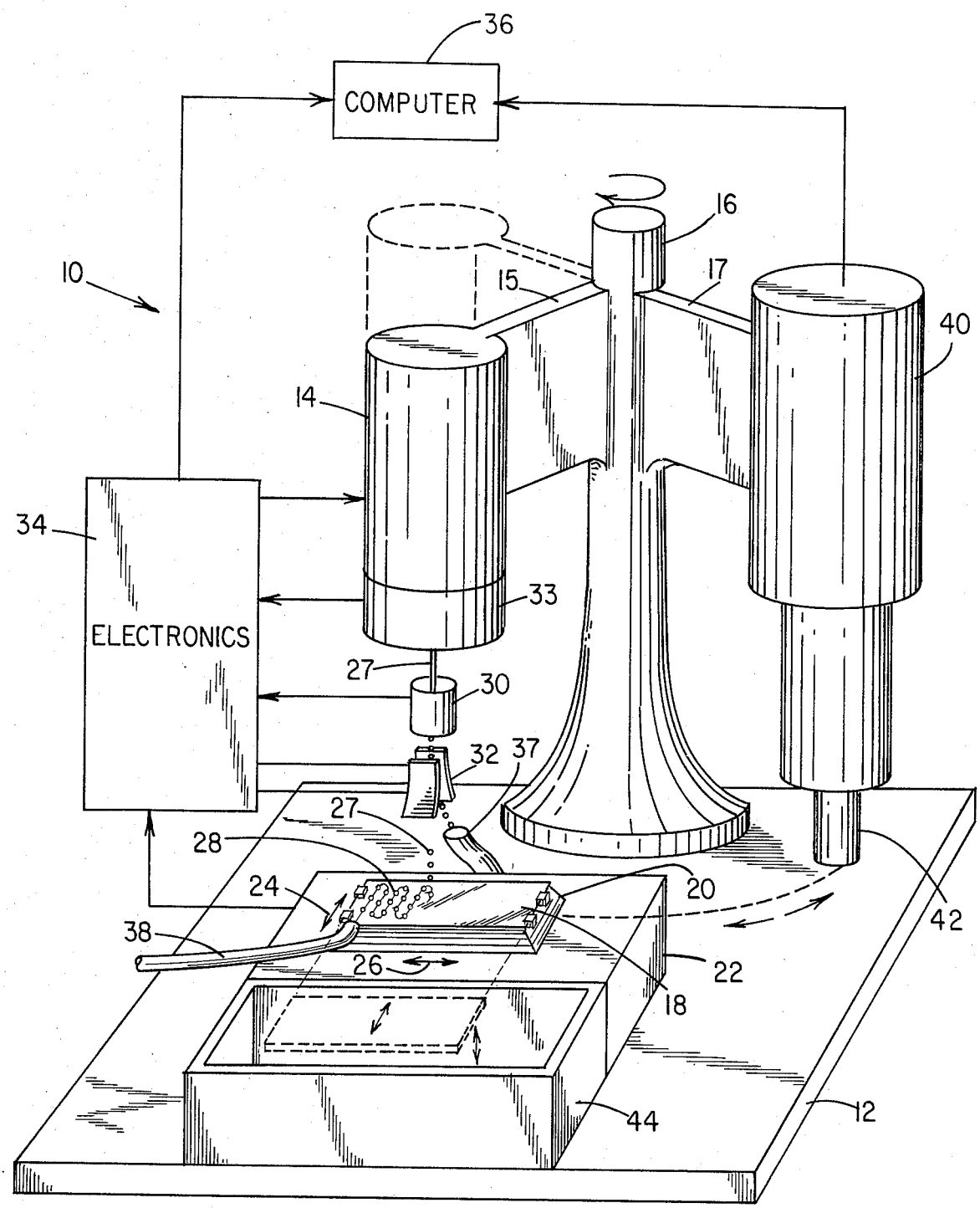

United States Patent [19]
Hogg

[11] 3,924,947
[45] Dec. 9, 1975

[54] APPARATUS FOR PRESERVATION AND IDENTIFICATION OF PARTICLES ANALYZED BY FLOW-THROUGH APPARATUS

[75] Inventor: Walter R. Hogg, Miami Lakes, Fla.

[73] Assignee: Coulter Electronics, Inc., Hialeah, Fla.

[22] Filed: Aug. 9, 1974

[21] Appl. No.: 496,178

Related U.S. Application Data

[63] Continuation-in-part of Ser. No. 407,811, Oct. 19, 1973, abandoned.

[52] U.S. Cl. .................. 356/39; 356/36; 356/38; 356/71; 356/72; 356/73
[51] Int. Cl.² ................ G01N 33/16; G01N 21/00
[58] Field of Search ............ 356/36, 38, 39, 71, 72, 356/73, 102, 208

[56] References Cited
UNITED STATES PATENTS
3,710,933  1/1973  Fulwyler et al. ........................ 356/39

*Primary Examiner*—Vincent P. McGraw
*Attorney, Agent, or Firm*—Silverman & Cass, Ltd.

[57] ABSTRACT

An apparatus for identifying particles in a liquid suspension with respect to certain measured characteristics and matching the actual particles captured on a suitable substrate or the like member with their previously measured characteristics.

One or more selected gross physical characteristics of individual particles are measured as the particles flow one by one in suspension through the sensing zone of a particle sensing device. The portion of the sample suspension which passes through the sensing zone subsequently is laid upon a substrate by a simple direct method which preserves the time relationships between the particles as they passed through the zone, there being a relative movement between the stream of the suspension and substrate.

Since the portion of sample suspension which passes through the particle sensing zone carries the particles with it, these particles will be laid down upon the substrate in a scanning pattern wherein the sequence of temporal relationships between individual particles determines the sequence of spatial relationships between the individual particles in the scanning patterns. Assuming that a record is preserved of the time relationships between the sensed particles, it is feasible to measure the spaces between the particles laid onto the substrate and match the spatial relationships with the temporal relationships for locating the precise particles which produced certain measurements.

In this manner observations of any captured particle can be added to characteristics measured on the identical particle to derive a substantial amount of information concerning that particle.

54 Claims, 4 Drawing Figures

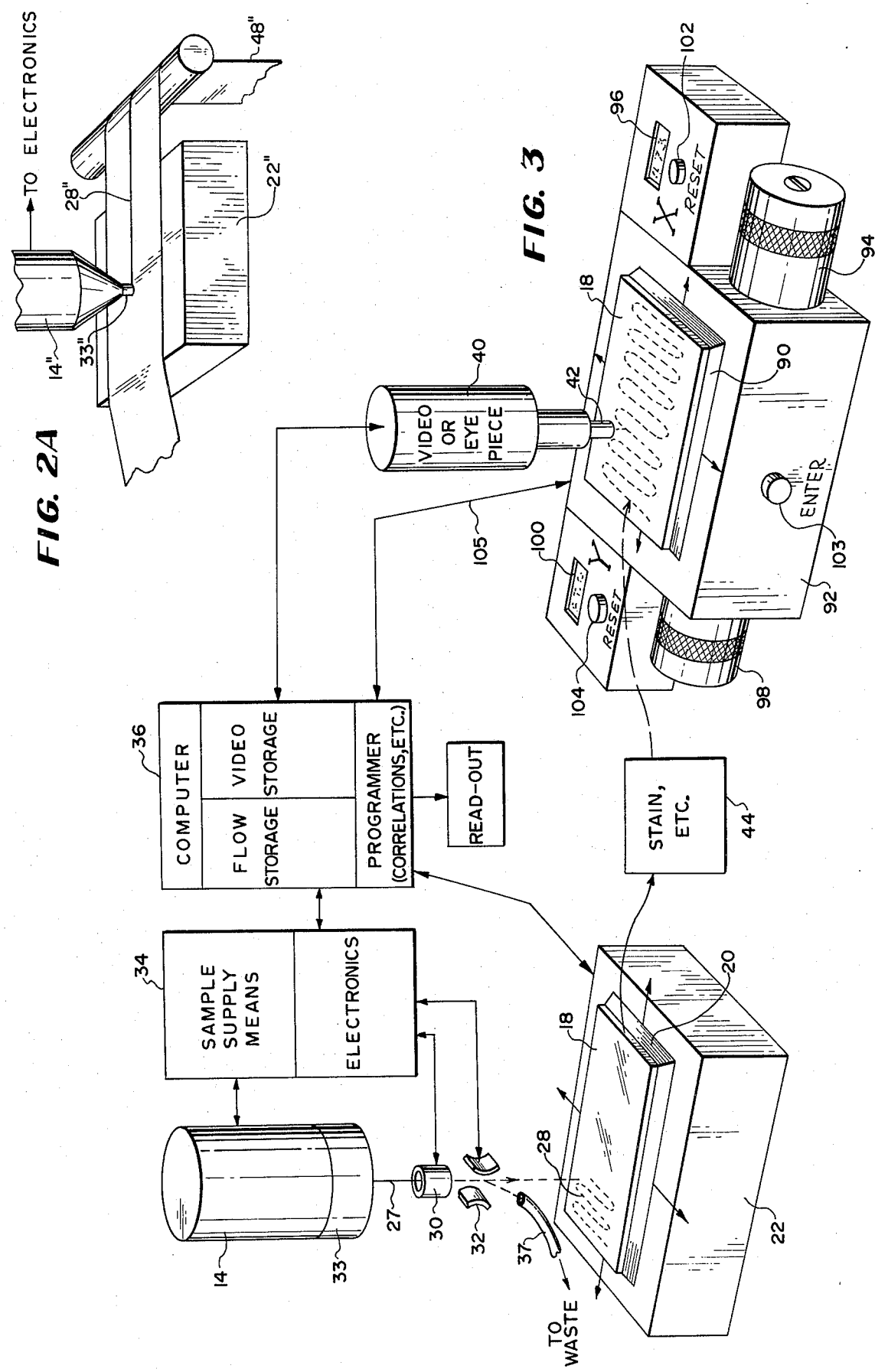

APPARATUS FOR PRESERVATION AND IDENTIFICATION OF PARTICLES ANALYZED BY FLOW-THROUGH APPARATUS

REFERENCE TO RELATED APPLICATIONS

This application is a continuation-in-part of my co-pending application Ser. No. 407,811 filed Oct. 19, 1973, and now abandoned, and owned by the same assignee at this application.

BACKGROUND OF THE INVENTION

The invention relates to a method and apparatus for identifying particles with respect to their previously-measured characteristics and for expanding information concerning said particles.

One of the most basic tools for measuring characteristics of particles at the present time is the so-called "Coulter Counter", an electronic particle sensing device whose structure and operation are generally disclosed in U.S. Pat. No. 2,656,508. The characteristics which can be measured electronically with instruments of this nature are particle size and parameters related to size along with the count of particles. Many other characteristics of particles can be measured optically as well as electronically, and in recent times such measurements are done at relatively high speeds and in flow systems. In all of these known apparatuses, the particles have their characteristics measured in gross, albeit individually, and as soon as the particles have passed the sensing zone where the measurements are actually made, the particles are discarded or commingled with others thereby losing their individual identities. In effect, the characteristics are measured and correlated statistically to a given sample.

For the most part, both in industry and in medicine, the data thus obtained are marginally satisfactory. The gross sample may be preserved and further tested, if desired, but any particular item of data cannot be related to any single particle. For example, suppose that one wishes to known what the particle causing a particular signal looks like — a signal from an electronic particle sensing device indicates that a particle or a group of particles twice the size of most of the others exists in a certain population. Until the advent of the present invention there was no known way of precisely identifying the particles with the respective signals even where means are available for capturing the particles.

In some instances, notably in the medical field, complete particle identification depends upon specific identification of particles of different types in populations containing particles of other types. Thus, a white cell count or concentration as measured by any instrument responding to a gross parameter gives only a fraction of the available information to be obtained from individual "dissection" of white cells in accordance with known identification techniques. The many different types of white blood cells depend for absolute identification upon many different facts which are gleaned from each cell. One is interested in the configuration of nucleus, the size of the cytoplasmic granules, the relationship of the cytoplasm to other components, etc.. A good appreciation for the problems of identifying the white cells in blood may be obtained from "Automatic Analysis of Blood Cells" by Marylou Ingram and Kendall Preston, Jr. (*Scientific American*, Vol. 223, Number 5, November 1970, page 172 and ff). This article also provides information on the lengths to which the field has gone to provide means for automatically identifying white cells.

The invention is not limited to the field of identification of blood cells but likewise is applicable to the identification of particles in other fields as well. Thus, it is applicable to the field of study of the characteristics of a wide range of industrial particles, including petroleum, food, fibers, metals, and the like. The invention was made for the particular use thereof in the medical and biological field and the discussion hereinafter will principally be concerned with the measurement and identification of blood cells, but this is to be understood as only by way of example.

As indicated from the above and from the article which has been mentioned, the recongition and classification of cells has been very important to the medical field for purposes of diagnosis, therapy and research. As the expansion of knowledge occurred, so did the need for more and more accurate identification and along with that came the great demand for automation in such recognition and classification. Instruments using the principles of U.S. Pat. No. 2,656,508 enabled the counting and sizing of white and red blood cells and improvements thereon permitted the simultaneous acquisition of information on hematocrit, hemoglobin, mean cell volume and many other indices. Many laboratories now obtain wide profiles of the characteristics of human blood and other body fluids by automatic chemistry equipments capable of accurately and routinely handling a great number of samples at very high speed.

The automatic recognition and classification of cells has not reached the state of efficiency which is represented by the many apparatuses of the general type mentioned above which measure gross characteristics of blood, blood cells and body fluids. It is not that attempts have not been made — on the contrary. Millions of dollars have been spent and the time of many brilliant minds has been occupied in trying to provide equipment which will obviate the tedious and difficult work being done in laboratories in order to achieve cell identification. Information on the different classes of white cells and exfoliated cells such as carcinomous cells is most desirable and even greatly essential at the present time.

Two general methods have been pursued in this search for the automatic cell identifying and classifying device. One method, referred to hereinafter as "pattern recognition" involves laying out the unknown cells upon a surface or substrate for automatic examination under a high resolution microscope. The slides are scanned by some transducer that responds to the display. For example a vidicon is used in the above-described article. The field is scanned and bits are stored representing the optical features of the cells. A computer suitably programmed in accordance with algorithms devised to enable cell identification is arranged to process the data from the field in an attempt to match the information with that with which it has already been provided. This dissection of the white cell images requires the processing of thousands or bits of information and involves expensive equipment including computers with large storage banks. Notwithstanding such a method and the complexity of the equipment involved, absolute recognition and classification is not infallible. The instrument described in the above mentioned article is not in general use — and in fact there is at the present time nothing automatic which can take the place of the absolute microscopic examination of cells by a skilled cytologist trained to identify visually certain types.

For obtaining an appreciation of the invention, it is pointed out that even the automatic machine contemplated by this method of pattern recognition depends upon the laying down of a number of the unknown cells upon a substrate and the operation upon only their optical characteristics. The advantages of additional measurements achieved by the use of electronic or even optical equipment in a condition of cells in suspension in a liquid are not available. This is because there is no known way prior to the advent of this invention to correlate a measurement on each cell on the substrate to some previously-made measurement of other characteristics of the cell.

Pattern recognition techniques can utilize glass slides which are made by any known techniques from suspensions of the cells in question. These are placed under the microscope and the image plane of the microscope is occupied by the television camera. The scanning is carried out by any methodical relative movement between the slide and the microscope objective such as for example, scanning along a zigzag line until a cell of interest is found and then narrowing the raster of the television camera to include only the cell of interest. This latter is then scanned in similar zigzag lines of smaller size.

Alternately, the entire slide may be scanned by a single raster using a spot which is very small — say a fraction of a micron in diameter. As the scanning spot crossed cells of interest bits of data representing color and/or position on a grey scale are stored in a memory and reconstructed by the computer which is associated with the equipment. Thereafter the bits of data regarding any particular cell may be operated on according to the special algorithms until it is decided what type of cell produced each sequence of bits. This theoretically appears to be practical but requires a vast memory and is insufficiently reliable to be accepted by the medical field.

An alternative to the classical glass slide is to use a trace laying pen to lay the suspension containing the cells of interest in a straight line upon a tape as it passes from reel to reel of a transport mechanism. This tape may be conducted through staining solutions, etc. in a manner explained in a publication "Cytology Automation" D.M.D. Evans (E. & S. Livingstone, Edinburgh & London, 1970). When the cells are thus laid out in a straight line, the matter of scanning and processing them is somewhat simpler than when laid out on a slide in a nondescript smear or pattern.

The second method employed in the attempt to automate examination of cells has been the so-called flow system method of which the apparatus of U.S. Pat. No. 2,656,508 is an example. While the Coulter Counter has for the most part replaced the crude and inaccurate hemocytometer, the manual classification and identification of white cells has not yet been replaced by any universally utilized flow system apparatus. In this method, very rapid measurements are made upon each cell (assuming that the dilution is sufficient to obviate most coincidence) as the suspension is flowed through a sensing zone. The sensing zone may be excited by light of one or another color or by an electric field. The gross parameters which can be measured by this method comprise cell volume or size, DNA content, RNA content, color, fluorescence, absorption of light, etc. For systems of this type reference may be had to U.S. Pat. Nos. 3,502,973 and 3,502,974. U.S. Pat. No. 3,497,690 describes a flow-through system in addition to apparatus which is of the first mentioned type using a slide specimen. Another disclosure of flow-through apparatus is described in Fulwyler U.S. Pat. No. 3,380,584.

The flow-through or on-stream methods enable some division of groups of cells, especially where the apparatus of Fulwyler U.S. Pat. No. 3,380,584 is used physically to separate the different cells on the basis of their different sizes. Thus cells in each group may be examined independently, but it has not been deemed possible to correlate measurements made on specific cells during the on-stream analysis with cells which were measured by pattern recognition methods. Specifically, a disadvantage of the on-stream method for automated cell analysis when compared to one based upon pattern recognition has been that, unlike the latter, there has not been a direct way to correlate the data obtained with the observations of a trained cytologist. It was possible by experimenting with leukemic blood of different types, for example, or by physical concentration of specific types of leukocytes to ascertain broadly which types of cells correspond to which gross physical characteristics, but it was impossible to do this on a one-to-one basis. This is true also in the case of cell separation as taught in Fulwyler U.S. Pat. No. 3,380,584 mentioned above. Fulwyler U.S. Pat. No. 3,710,933 also describes a particle sorter. Both utilize the sensing concepts taught in Coulter U.S. Pat. No. 2,656,508.

Obviously, even in the separation techniques of the Fulwyler patents, the only information which could be acquired related to groups of cells and not to individual cells within the groups.

It is clear that neither of the two methods mentioned above gives completely reliable analysis. The combination of the two methods, while not necessarily providing the ultimate in cell information should certainly provide increased data on cell recognition and identification then heretofore achieved and the invention seeks this end, primarily. It has been recognized that this combination is desirable by those skilled in this art, but those same persons have not considered that it could be accomplished.

Some of the measurements may be considered redundant insofar as positively identifying cell or particle types, but it is also possible that such redundant data, if recorded and correlated with other information, such as clinical findings in the case of cells, could prove as valuable, if not more so, than the data derived from classical observation and classification.

In the discussion which follows, mention will be made of some terms which should be defined.

The term "pattern recognition" is accepted in this art as meaning the techniques of particle classification through the identification of shape, interior physical features and the like. The article in *Scientific American* mentioned above describes a system which depends upon pattern recognition.

The term "scanning pattern" as used herein is intended to mean the result of the orderly method in which the suspension containing the cells is laid down upon a substrate. In the prior art, smears or samples upon substrates are common and the actual arrangement of the particles or cells in such cases is nondescript. As will be seen, according to the invention it is essential that there be a spatial relationship between the particles as laid down upon the substrate. This demands that there be some recognizable scanning pattern that permits of measurement of the spacing between particles. The pattern may be serpentine, rectilinear, arcuate, zigzag or the like. It must be such that the required spatial measurements can be made. This in turn requires that the velocity of movement of the substrate between particles be known or ascertainable.

The term "temporal pattern" as used herein is intended to mean the timed relationship between particles as they pass through the sensing zone of the flow system. As will be seen, one of the keys to the successful utilization of the invention is the fact that although the particles arrive at and pass through the sensing zone in an absolutely random temporal pattern, the projection of these particles in their diluent directly to a substrate that moves relative to the sensing zone will result in a spatial pattern of particles in the scanning pattern on the substrate whose spacing is precisely matched to the temporal pattern. When the temporal and spatial patterns are perfectly matched the information retrieved from the flow-through scanning activity can be matched to information retrieved from the scanning of the pattern on the substrate.

SUMMARY OF THE INVENTION

The invention contemplates a method of and apparatus for achieving a substantial body of information relating to particles by combining the benefits of two known techniques which have been deemed mutually exclusive until the advent of the invention.

According to the invention, information is derived from particles which are suspended in a diluent and are carried in a so-called flow-through or on-stream system by passing these particles through a sensing zone which is either electrical, optical or both. The temporal pattern of the particles as they move through the sensing zone is preserved and identified with the data that are derived from the measurements made in the sensing zone. Each particle thus carries one or more bits of information relating to some characteristics thereof which normally is measured by the particular type of sensing zone. In addition, the time elapsed between the passage of the individual particles through the sensing zone is carefully measured and preserved as a temporal pattern.

The succession of particles, either entrained in a jet of discrete droplets or carried by a continuous stream of liquid leaves the sensing zone in the same but slightly delayed temporal pattern of their successive measurement in the sensing zone and are caused to impinge on a moving substrate. The substrate is being moved transversely of the jet or stream and captures the same upon its surface. Assuming there is no relative movement of particles after capture, if the velocity of the moving substrate is constant, the particles will be laid down with the physical distance between any two particles proportional to the time interval between these same two particles as they went through the sensing zone. Since it is known that the intervals between the arrival times of successive particles at the sensing zone are perfectly random, no two successive sequences of intervals of any appreciable length will be the same; hence if the arrival times of the particles or the intervals between pulses produced by the sensing zone are recorded, this sequence of random intervals will be unique for any train of particles.

In the apparatus of the invention, particles are placed in suspension in a particle sensing device and moved through the sensing zone of the device. For example, a device constructed in accordance with the Fulwyler patents ejects a stream of discrete droplets containing the particles after they have been sensed. The analog information derived from the sensing is preferably converted into digital form, means are provided to store the information derived from the sensing and from the time of the intervals between particles. A substrate moving in accordance with a constant velocity captures the droplets and the spatial pattern consisting of the physical distance between captured particles will be proportional to the temporal pattern made by the particles in the sensing zone.

If the substrate is scanned beneath a scanning microscope and is moved with the identical velocity as the original substrate was moving when the particles were captured, the distances between particles will be converted back into the identical temporal pattern, and if intervals in the scanning microscope between observations of cells of interest are recorded, it will be a simple matter to program the computer which stores the data and information to identify the measurements made on each particle of the substrate with the corresponding measurements made on the same particle as it went through the sensing zone of the particle sensing apparatus.

Such particle sensing apparatus can be an electronic device, an optical device and variations of these.

The speed of the substrate need not be constant or even linear if the movement of the scanning microscope is identical; hence under such circumstances the track of laid down particles can be spiral, zigzag or serpentine without concern as to the exact speed. If the movement is constant and rectilinear, the measurements will enable proportionality to be determined by an scanning device that moves rectilinearly in accordance with a proportionality constant. The measurements can even be made on the substrate manually, enabling the substrate to be stored and correlated to the sensing zone measurements at any later convenient time.

Staining can be accomplished after the formation of the sequence of particles on the substrate, if desired. Alternatively, or in addition, the particles may be tagged with fluorescent dyes or prepared in any other useful manner before being passed through the sensing zone or zones.

BRIEF DESCRIPTION OF THE DRAWINGS

FIG. 1 is an illustration of one embodiment of the invention shown in a combined diagrammatic and block form;

FIG. 2 is a similar illustration but showing a fully automatic pattern recognition and particle identification system constructed in accordance with the invention and comprising another embodiment thereof;

FIG. 2A is a fragmentary diagrammatic view showing a modified form of the invention similar to that of FIG. 2; and FIG. 3 is an illustration of a further modified form of the invention.

DESCRIPTION OF THE PREFERRED EMBODIMENTS

The basic components of the invention are first, a structure which is arranged to make measurements of a gross nature on particles carried in suspension as these particles are passed in succession through a sensing zone while deriving in addition to these measurements information related to the intervals between particles; second, structure for projecting the particles after passing through the sensing zone in a stream against a substrate that moves relative to the stream in accordance with a particular plan of movement so that a scanning pattern of the particles is laid down upon the substrate which can be related as to the spacing between laid down particles to the intervals between the particles as they passed through the sensing zone.

The practice of the invention contemplates that the measurements and information from the scanning of the particles by the sensing zone will be stored and made available to one who makes further measurements on the particles carried by the substrate. Either by manual means or by automatic computation through the use of suitable computer techniques, the individual particles can be directly related to their respective measurements made in the sensing zone so that the information derived from the both measurements can be combined. In this way substantially more is known about any particular particle than could be derived from only one of these measurements. Recognition and classification are substantially improved to a degree that represents more than general accumulation of information on two related groups of particles; instead it is precise information on each specific particle of a group on a one-by-one basis.

The methods of the invention as will be explained are capable of being practiced with many different kinds of apparatus and systems. Those structures which are detailed are ideally suited for the practice of the methods of the invention but their illustration and discussion should not be considered limiting.

In FIG. 1 there is illustrated a relatively simple system for practicing the invention which utilizes the Fulwyler patented structure for producing droplets containing the particles. The particle-carrying droplets are projected onto a slide which will have the scanning pattern laid out thereon, and then further measurements can be made on the slide.

The apparatus is generally designated by the reference character 10 and the mechanical and fluid components for the most part are shown mounted onto a base or platform 12. The particle scanning device 14 is shown mounted on an arm 15 of the standard 16 that is capable of being rotated as indicated by the arcuate arrow. Arm 17 carries a scanning apparatus 40 to be described hereinafter. The positions of the arms 15 and 16 as shown in solid lines in FIG. 1 can be achieved by providing suitable detent means (not shown).

The particle scanning device 14 includes a droplet generator of the construction detailed in Fulwyler U.S. Pat. No. 3,380,584 and arranged so that droplets are ejected along a vertical axis downwardly onto a substrate 18 which may be a glass slide, but preferably should be absorbent.

The substrate 18 will have a surface that will retain the droplets without permitting them to move after they impinge in order that their positions upon impact remain fixed. For example, the substrate 18 may have a special surface of frosted or fritted glass. The substrate 18 may be made out of absorbent material such as pressed paper or porous rigid resins in order to enable the diluent constituting the liquid of the droplet to be drawn away by capillary action or sucked through the slide 18. Note vacuum conduit 38. Thus it is preferred that the slide material be foraminous.

The slide 18 is mounted onto a carriage 20 which is mechanically driven by any suitable driving mechanism such as symbolically designated 22 to move relative to the stream of droplets 27. In this instance the path of movement of the carriage 22 relative to the stream 27 is front to rear and vice versa in an oscillating movement indicated by the arrow 24 and to the right and left intermittently or continuously as indicated by the arrow 26. This will result in a serpentine type of pattern as indicated by the reference character 28, but it should be understood that this scanning pattern is only one of many that can be made. For example, the substrate 18 may be in the form of a narrow ribbon or strip of sheeting that is capable of retaining the particles as deposited without shifting of particles. A synthetic resin of transparent or translucent nature would be useful as would be paper or fabric through which the liquid could be aspirated to leave the particle for scanning.

The droplet generator of the device 14 includes a droplet charging ring 30, deflection plates 32 and a jet-forming orifice above the stream 27 (not shown).

Particles to be studied are suspended in an electrolyte and introduced into the particle scanning device 14 which includes the droplet generator. The particle sensing device in this example is of the structure of Coulter U.S. Pat. No. 2,656,508 in which a suspension of particles is moved through an aperture through which an electric current is also flowing. The effective impedance of the aperture is changed by the presence of a particle passing through the same and this change generates a signal whose duration is substantially the time that it takes for the particle to pass through the aperture and whose amplitude for the most part is proportional to the size or volume of the particle.

The number of signals will represent the number of particles which pass through the aperture thus enabling a count to be made using electronic counting means capable of responding at very high speed. The individual signals represent the individual particles passing, each signal having an amplitude which is substantially proportional to the size of the particle producing the same. Thus, these signals can be stored in the order of their generation. The time intervals between signals can also be stored as information in suitable storage means of a computer, for example. Each particle will have its individual address for the signal and interval information.

Other information relating to particles can be obtained by transducing means responding to the passage of particles through electrical or optical sensing zones in liquid suspension. The so-called gross physical qualities of the particles can be measured and recorded as electrical analog quantities, and these physical qualities may include response to aperture currents of multiple frequencies, response to different wave lengths of light, fluorescence, electrical opacity, and so on. Fulwyler U.S. Pat. No. 3,710,933 describes several different parameters that can be sensed.

In the example which is described, the particles are intended to be entrained in droplets of the electrolyte or liquid in which they were suspended when passing through the sensing zone, it being appreciated that in certain instances the diluent need not be electrically conductive. It is assumed for the sake of this description that the particles which are being studied are white blood cells and that they are suspended in saline solution and that their sizes are being measured in a Coulter type sensing zone.

After the jet stream of particles 27 passes through the jet-forming orifice which in this case is also the aperture for the Coulter transducer, such stream of particles is passed through the droplet charging ring 30. The electrical circuitry for operating the particle sensing device and the droplet generator is designated generally by the reference character 34 shown in the block at the left. Connections extend to the charging ring 30, the jet forming means indicated at 33 and the deflector plates 32. The circuitry for the operation of the Coulter particle detecting device is also included, and will comprise a current source for the aperture and circuitry to detect the signals produced by the particles passing through the sensing zone, amplifying and shaping them, etc.

The droplet stream 27 may be deflected by the plates 32 as to droplets which are not of interest. For example, a suspension including white and red cells may be separated by the techniques which are described in the Fulwyler patents so that only white cells are permitted to pass through the plates directly onto the substrate 18 while the droplets containing the red blood cells or other undesirable particles are deflected to a waste tube 37.

The information which is obtained from the sensing of the particles passing through the sensing zone may also be selected on the basis of discriminatory circuits so that there is no accepted information corresponding to the particles in droplets discarded to waste 37. This is easily done on the basis of amplitude of signals, for example, where there is a readily detectable difference between signals from one category of particle and another. Discriminating between red and white blood cells is a relatively simple matter due to their differences in color and sometimes size.

The desired information in electrical analog form which may be also digital is passed from the electronic circuitry 34 to the computer 38 where, as explained, each particle has its own address where information on measurements made in the sensing zone and interval time are stored for later call-up.

The particles in the sample being measured are diluted in electrolyte to the extent that droplet generator of the particle sensing device 14 seldom provides more than one particle in each droplet as the droplets are formed, ejected and caused to impinge upon the surface of the slide 18. If the surface is caused to move at a constant velocity, the physical distance between the particles will be proportional to the time intervals between particles as they are emitted. Accordingly, these physical displacements will make possible a chain of measurements proportional to the random intervals of the particle pulses that are produced as the particles pass through the sensing zone of the particle sensing device 14.

The slide 18 containing the predetermined pattern of droplets is scanned by a scanning apparatus 40 which includes a microscope 42 mounted on arm 17. The slide 18 again is moved through a scanning pattern which is identical to the serpentine pattern 28 in which the particles were laid down. The spatial intervals between the particles in the pattern 28 are measured by the scanning microscope 40 and recorded in the computer 36. The computer 36 is programmed to correlate the spatial measurements made between particles on the slide with the corresponding temporal relationships between particle pulses produced as the particles pass through generator 14.

It has been noted that the speed at which particles are scanned during the scanning procedure need not be constant. The speed need only be identical during the slide formation and examination, thereby permitting nonlinear speeds as would be needed to track the form of a spiral, for example. A spiral track might be useful since the x and y movements are substantially sinusoidal and would involve the least acceleration of the slide thereby enhancing the accuracy and longevity of the driving mechanism.

In operation, the droplet generator of the particle sensing device 14 is used to lay droplets containing particles of interest onto the slide 18 in the manner described.

The stage scanning mechanism, that is, the means 22 for driving the slide carriage 20 could be provided with means for reversing the direction of the scan cosinusiodally (differing from sinusoidal movement by phase displacement) at the end of each width and stepping from one line to the next sinusoidally, thereby maintaining constant speed during the reversal of direction and incrementing to the next scan line. At the opposite side of the slide the process would be reversed, that is, the sideways motion would be reversed cosinusoidally and the lengthwise motion would be incremented sinusoidally. The use of cosinusoidal and sinusoidal drive, besides maintaining constant constant velocity in the direction of the scan, provides minimum acceleration for durability of the mechanism and the least danger of shaking off the deposited droplets.

When the substrate 18 is covered with particles, it is removed from the scanning stage either manually or automatically and may be passed through a staining bath 44. When the staining is complete and the particles are fixed in position on the slide 18, the slide is returned to position on the movable carriage 20 and the optical microscope 42 brought into position. Alignment of the microscope at the beginning of the pattern on slide 18 can be done by any one of a number of known techniques, i.e., one or several droplets can be ejected onto slide 18 and the microscope positioned exactly on a single droplet. This single droplet might be on the upper left-hand corner of the slide or any convenient location which would ensure registration as the droplet generator 14 is replaced by the microscope 42. Having done this, of course, the only problem is the delay, i.e., the time it takes the droplet to fall from the droplet generator to the slide 18. This is why the technique of the present invention becomes necessary.

As the particles are passed through the particle sensing device 14, the time intervals between successive droplets are measured. These temporal intervals are recorded as part of the information derived from each particle as described previously. It would be possible either to record the interval before a particle or the interval after a particle; either way would be acceptable, as long as consistency is maintained. As the particles are laid down upon the substrate, the temporal intervals combine with the velocity of travel over the scanning pattern to create a proportional spatial pattern on the substrate. If the microscope is caused to travel over the scanning pattern at the exact same velocity, this spatial pattern is translated back into the original temporal pattern if desired for ease of measurement and comparison, as, for instance, by counting the cycles of a clock oscillator (not shown) incorporated into the computer 36. The spatial pattern between particles on the slide 18 are thus measured and then compared with the temporal pattern previously measured when particles of interest were passing through the particle sensing device of droplet generator.

The two patterns are recorded and compared by computer 36. The first pattern, comprising the temporal relationship between particle pulses is matched with the second pattern comprising the spatial interval between particles of interest in the serpentine pattern 38, such that a particular particle on slide 18 can be matched with its particular electrical measurement contained in the first pattern. For example, suppose the temporal intervals between particles have the following sequence:

Series A, 10, 18, 45, 6, 11, 8, 20, 4, 13, 19, 7, 15, 27, 4, 32, 12, 27, 18, . . .

This series represents the intervals perhaps in microseconds between the particles as they pass through the sensing zone of the particle sensing device 14. When the particles are deposited upon slide 18 they will appear in the same order. Consider that the slide is examined after having been stained and fixed and the intervals are found between particles in the following order:

Series B. 12, 8, 24, 16, 10, 18, 45, 6, 11, 8, 20, 4, 13, 19, 7, 15, 27, 4, . . .

Visual inspection of these two series will disclose that the first number, 10, in the first series, Series A, reappeared as the fifth number in the second series, Series B. Thereafter, the both series are identical. Since the random arrival of the particles is the same at both the jet forming orifice 33 of the droplet generator and at the slide 18, it is apparent that the particle which terminated the ten microsecond interval and initiated the 18 microsecond interval was the second measured particle to go through the jet-forming orifice. The sixth particle of the slide which terminated the 10 microsecond interval and initiated the 18 microsecond interval was the same identical particle.

In general, the two series can be thought of as portions of two infinite random series which differ only in phase. In a practical instrument, it may be difficult to achieve any correlation at the beginning of a run between the two sequences due to starting transients on the slide scanning mechanisms and the jet-forming orifice 33 of the droplet generator of the particle sensing device 14, such that the technical problems in ensuring that the first particle to leave the generator 14 will be the first particle on the slide will be extremely difficult, if not impossible. It is best, therefore, merely to ignore the first particles and wait until the system is in equilibrium before attempting a correlation. Also complicating the fact is that the thresholds on the two apparatuses respond to different parameters, and it is quite possible one would respond to a cell and not the other, and/or vice versa; but, as will become evident later, the examination of the interval pattern will tell conclusively what happened in any such event.

Every time a particle has gone through the sensing zone of the apparatus 14, data has already been taken on the particle which includes such parameters as mentioned. All of these measurements in electrical analog form are stored in the computer at an address reserved for each particle. Another type (or "byte" as known in computer terminology) of data that is entered at this address is the interval which separated one particle from its adjacent particle. As explained above, after the slide is made, stained and ready for analysis, spatial measurements are then taken, each of the measurements being stored in an address of the computer corresponding to each particle. The interval or distance separating each particle from the particle adjacent thereto is also stored in the memory.

Referring back to the above example described as Series A and Series B, it becomes apparent that the second particle of the first series is the sixth particle of the second series; therefore, one is able to combine the measurements on this particle from both series and be certain that only a single particle is involved. The computer 36 duplicates the reader's mental processes and arbitrarily selects a number in the first series and then steps along the addresses looking at the intervals in the second series until it finds a match. In the example described above, this would be the interval value of 10. The computer then increments one position in each series and makes another comparison. In this case it would find 18 appearing in both series. It would increment again and find that 45 appeared in both series. At this point, it would be quite probable that the computer has found the sequence which will result in the positive identification of each cell.

The computer can effect this comparison for a great many intervals and thus reduce the probability of mismatching to as near zero as is desired. A possibility exists that the same interval may appear more than once in the same series, as for example, interval 4, which is in the 8th and 14th interval of the first series. The computer would stop at this interval but would upon assay discard the interval as improper when it incremented and found that the following interval was 32 in one case and 13 in another. Furthermore, incrementing again it would find that the next interval was 12 in one series and 19 in the other. The computer would reject and try again. This would continue until the computer found the right match. It is relatively a simple matter to program the computer to do this.

When the particle sensing device 14 fails to respond sufficiently because of the small size or low phosphorescence of the particles or for any other reason fails to respond to one of the particles of the series, the first series would become:

10, 18, 45, 6, 11, 8, 20, 17, 19, 7, 15, 27, 4, 32, 12, 27, 18, . . .

Or when the microscope examines the resulting slide it would find intervals:

12, 8, 24, 16, 10, 18, 45, 6, 11, 8, 20, 4, 13, 19, 7, 15, 17, . . .

The common interval 10 is followed by the common interval 18, followed by 45 in both cases, and followed by 6 in both cases, followed by 11 in both cases, followed by 8 in both cases, followed by 20 in both cases. The next match or comparison would find 4 in one series and 17 in the other. In this case the computer having found so many matches, would be programmed to stop here and go into another loop and compare some of the adjacent intervals with one of the other intervals. Accordingly, it would find a sum of 4 and 13 in the second series is the same as the 17 in the first series. It would know that the particle separating intervals 4 and 13 in the second series has been missed somehow in the first series. This face would be flagged and the program continue on. Then 19 would be 19, 7 would match 7, 15 would match 15, etc. except now, of course, instead of the fifth number in the second series matching the first number in the first series, the 14th number in the second series will match the 9th number in the first series. This might happen either way, but the automatic scanning microscope 40 can miss a cell; whereas, the particle sensing device within the droplet generator 14 would detect the particle. Whatever happens, however, a computer program can find out what happened, flag the incomplete data and continue on.

A third problem associated with the above system is that particles or cells may have slightly different delay times between their exit from the droplet generator of the particle sensing device 14 and their landing on the slide due to the peculiarities of the flow in the jet before the droplets are formed. This is commonly referred to as "jitter". The difference in the delay times is overcome by having "windows" such that a slight change in the interval would not affect the numerical dimensions of the interval unless a particle just happened on one of the borders of a window so that an interval appeared to be in the next larger category from what it should be, or smaller. This may be illustrated by the following series: (the first series is the same as Series A above)

10, 18, 45, 6, 11, 8, 20, 4, 13, 19, 7, 15, 27, 4, 32, 12, 27, 18, . . .

The second series might come out:

12, 8, 24, 16, 10, 18, 45, 45, 12, 8, 20, 4, 13, 19, 7, 15, 27, 4, . . .

The eighth and ninth numbers 5 and 12 respectively, in the second series differ from the original series in that the first one is smaller, and the second one is larger, an effect which would be produced by a particle arriving at the slide a fraction of a second sooner than the average, thus substracting from the previous interval and adding to the following interval. On way in which a computer might recognize that this happened would be to add successive pairs or triplets of intervals. If successive pairs are added the following series is produced:

28, 63, 51, 17, 19, 28, 24, 17, 32, 26, 22, 42, 31, 36, 44, 39, and 45.

The second series formed by adding consecutive pairs of intervals, yields the following series:

20, 32, 40, 26, 28, 63, 50, 17, 20, 28, 24, 17, 32, 26, 22, 42, and 31.

In this second series, the fifth number corresponds with the first number of the first series, the sixth number to the second number of the first series. However, the seventh number of the second series differs by one from the third number of the first series. The eighth number of the second series is found to be the same as the fourth number of the first series and the ninth number of the second series differs by one from the fifth number of the first series. Recalling that by adding consecutive pairs the eighth and ninth numbers of the second series were both different from the fourth and fifth numbers of the first series. Since the eighth number of the second series formed by the addition of the consecutive pairs is the same as the fourth number of the first series, a program can be written for a pair of series in which if two consecutive numbers in both series differ, the program will check the sum of these anomalous figures from the sum of the corresponding intervals from the first series. If the sums are equal, the difficulty produced by this difference in the delay times can be ignored. In this instance, the particle terminating the fourth interval and beginning the fifth interval of the first series is the same particle that terminated the eighth interval and commenced the ninth interval of the second series.

Other types of techinques for identifying the proper phase can be generated by added a second set of triplets of the first series. It can be seen that the numbers which do not correspond with the homologs in the opposite series move farther apart from the number respresenting the particle which experiences the time delay. Simply stated the intervals which match can be left unaltered and the computer can make trial additions on the intervals which do not match until such time that a sum matches an interval of one of the series, or until two sums match, and continue on when this match is found.

Another scheme for finding the proper phase is to substract intervals in one series from intervals in the other for twelve or so intervals. The series of differences are added. The phase is stepped repeatedly. When the proper phase is found, the sum of the absolute vlues of the differences suddenly becomes very small. The twelve intervals examined then may be stepped along until a non-zero indicates a lost particle or jitter.

Referring again to FIG. 1, the carriage driving mechanism 22 and hence the slide 18 can be returned to its original position and starting point with the microscope 42 rotated on column 16 to a position over the slide 18. The slide 18 may then be passed through an indentical cycle at the same speed as the droplets were formed. Each time the microscope 42 sees one of the particles which was deposited by the droplet forming device 33, it will measure the interval separating it from its predecessor and store this information at another location of the computer. Thus, information will later be used as described above to identify the individual particles. After the train of intervals between particles on the slide is measured and the particles are all indentified, the carriage driving mechanism 22 can return the slide 18 once more to its starting position and scan the particles one at a time, stopping at each as long as necessary in order for an observer or a suitable apparatus to perform other particle recognition procedures as may be required depending upon the type of particles in the original sample. The data obtained from the particle recognition procedure can be stored in the computer's memory at that particle's address and the computer program, as described, stores this additional information with corresponding information obtained during the droplet formation. The above procedure greatly increases the quantity of information available for study of each particle.

As an alternate procedure, the carriage driving mechanism 22 may be stopped on each cell of interest while a pattern recognition scan is made, for enabling the storage of data on the various features of the cell in the computer memory. At the same time the interval-measuring clock is stopped. When the motion of the carriage driving mechanism 22 is resumed, the clock oscillator is energized and counting resumed. This permits acquisition of all data in one pass over the scanning pattern.

Figure 2:
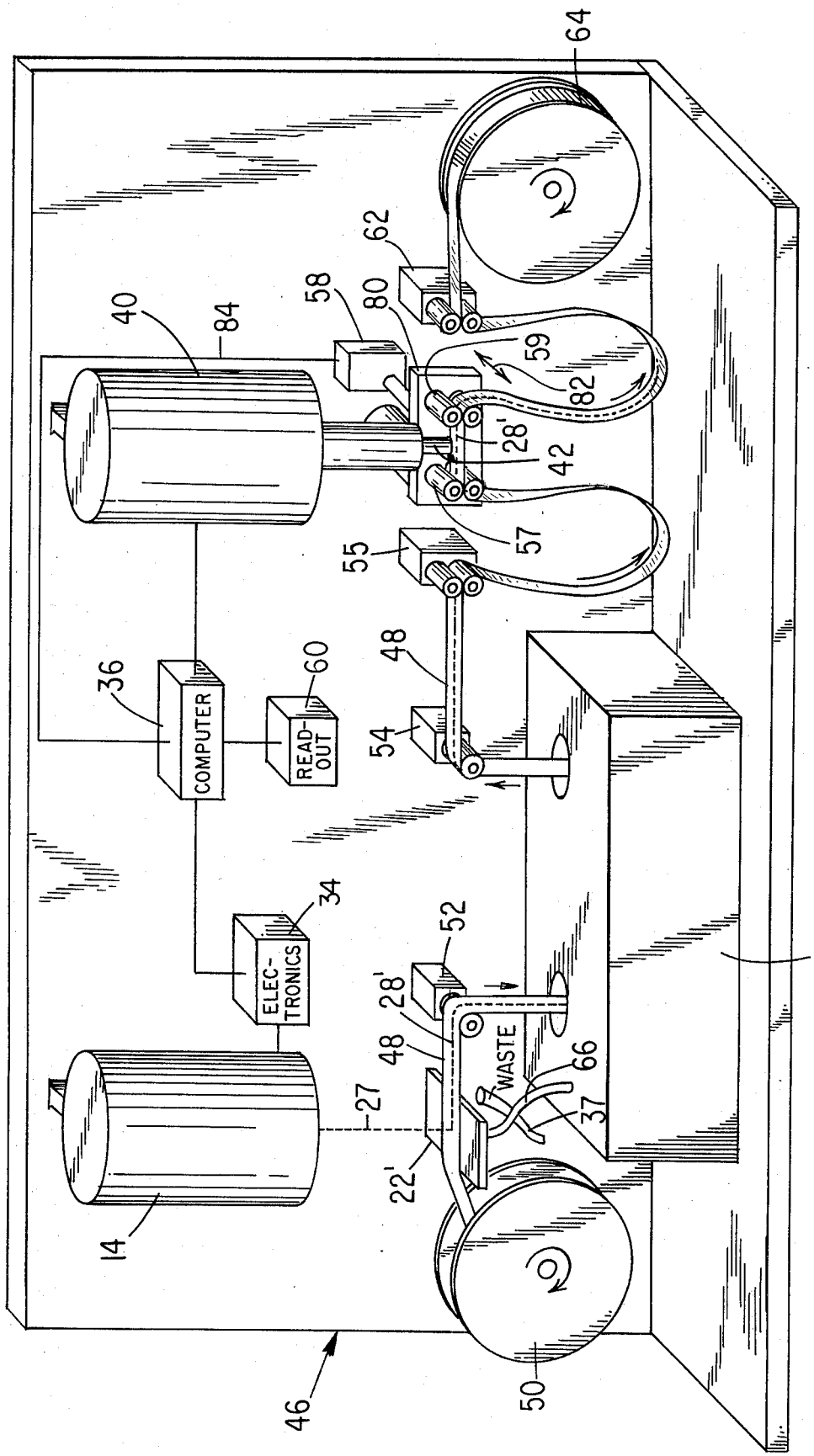

In FIG. 2 there is illustrated apparatus 46 which provides fully automatic pattern recognition and particle identification utilizing the teachings of this invention. The apparatus is designated generally by the reference character 46 and similar parts are designed by the same characters used in the structure 10 of FIG. 1.

The substrate in this instance comprises an elongate ribbon or strip 48 of some suitable absorbent or porous material such as for example a firm paper or resin having a foraminous body capable of retaining the particles deposited thereon. The liquid of the particles is to be aspirated through the substrate member 48 by some vacuum means such as shown at 66. This substrate strip 48 is provided on a supply reel 50 at the left, passes onto a platen or carriage 22', over a capstan 52, down into an automatic staining apparatus 56 and back out of the staining apparatus over a capstan 54, down through a series of pinch rolls 55, 57, 59 and 62 which provide a controlled drive under the microscope 42 and thence onto the take-up reel 64. The pinch rolls and capstans may all be driven at the same speed or storage means can be incorporated into the staining means 56 to take up the differences in speed.

The particle sensing device 14 in this case also uses the principles of the Coulter U.S. Pat. No. 2,656,508 as well as any other known on-stream sensing zone so that there is a stream 27 of sample suspension ejected from the sample ejecting means 33, impacting against the substrate 48. The signals developed in the sensing zone or zones are processed in the usual way by the electronics 34 and routed to the computer 36.

The apparatus 56 is an automatic slide staining apparatus and the substrate 48 with its track moves through this apparatus and into the capstan system which has been described. The pinch rolls 57 and 59 are mounted on a carriage 80 which is capable of being driven back and forth transverse of the long dimension of the tape substrate 48 as indicated by the arrow 82. The electrical connection shown at 84 extending from the drive mechanism 58 to the computer 36 is for the purpose of indicating that the movement of the carriage 80 follows any wandering laterally of the stream 27 so that the microscope objective 42 accurately follows the track 28 of the particles. Thus the line of samples is always accurately centered under the microscope objective. Any known method of registration can be incorporated into the apparatus 17 to ensure that the lateral position of the substrate 48 provides the proper scanning position at the carriage 80 to compensate for any lack of parallelism between the linear scanning pattern and the tape substrate 48 or inaccuracies in the capstains. Timing along the track is, of course, immaterial since the information derived from the particle sensing device 14 will have already been stored at a proper address and the information derived from the microscope 42 will be properly matched and sent to the same address for the indentical particle by the computer.

The article 40 in this case is a closed circuit television scanning device which is arranged to cooperate with the microscope 42 and to transmit received information to the computer.

The loops of tape between 55, 57, 59 and 62 permit lateral motion of the carriage 80 for reasons given above, and also permit stopping the tape while performing pattern recognition on particles found by the television camera-computer combination. As long as the motion is according to the proper law (constant in this case) between particles, the measurement of intervals is not affected. The remainder of the apparatus is self-explanatory.

Instead of two reels for sample-bearing tape it would be possible to have four such that the laying down of sample on the tape and the pattern-recognition procedure could be done on different machines and/or at different times and places.

In both cases which have been described, storage of information can be effected by means of discs or tapes working in conjunction with the computer. Thus, the information derived from the particle sensing device 14 in each case as the particle goes through the sensing zone can be accumulated in such storage means and read back into a memory of the computer when the comparison with the pattern recognition computer data is made.

FIG. 3 illustrates an embodiment of the invention in which there are two separate scanning stages. The particle scanning device 14 with its jet and droplet forming structure 33 forms the stream of droplets 27 that passes through the charging ring 30, past the deflecting plates 32 and strikes the substrate 18. The substrate 18 is mounted to a carriage 20 that is driven by some mechanism 22 similar to that of FIG. 1 to produce the track or trace 28 of particles on the surface of the substrate 18. Waste tube 37 receives deflected droplets containing no particles or particles which have no interest. The large block 34 is shown composed of two parts marked "SAMPLE SUPPLY MEANS" and "ELECTRONICS". This division is not intended to be limited but merely to illustrate that means are required to perform several mechanical and electrical functions and to correlate them. Thus, the particle scanning device 14 and droplet forming structure 33 may embody the Colter patented structure and the Fulwyler patented structure necessitating a sample fluid supply, controls, fluid handling valves and conduits, excitation circuitry for forming droplets, filters, detectors, amplifiers, analyzer logic, charging circuitry, discriminators, deflection electronics, power supplies, interfaces with the computer and carriage driving mechanism, etc.. All of this is represented by the block 34. Various connections to the components are also shown.

There is a path from the block 34 to the computer 36 which, as noted, is formed of two parts, one of which relates to flow functions and measurements, and the other of which relates to video measurements and data. Principally the measurements made as the particles are scanned in the sensing zone together with their temporal pattern will be routed to the "flow" part of the computer 36 and be stored there. There will thus be a measured parameter storage and a pulse arrival time or separation interval storage.

After a slide 18 has been made, it may be removed from the carriage 20 and transferred to a staining and fixing device 44 following which the slide 18 is placed on a carriage 90 carried by a second scanning stage 92. This second stage 92 may be identical to the first stage 22 or it may be manually movable by fine vernier controls. For example, an x control in the form of a knob 94 coupled to the carriage 90 and the visible register 96 is shown at the right side; and a y control 98 with register 100 for moving the carriage 90 at right angle to the movement affected by control 94 is shown at the left. By this structure, the microscope 42 may be accurately positioned over any particle. The microscope may be strictly manual or may have the television video scanner 40 associated therewith, channeling information to another part of the computer designated video storage.

Position of the slide 18 is indicated by the two counters or registers 96 and 100. These display a number proportional to the distance from a starting point as indicated by the reset buttons 102 and 104.

In operation the microscope 42 would be trained on a reference particle of the track 28 and the counters 96 and 100 reset to zero. Thereafter the physical motion knob 98 would be advanced until a particle appeared under the microscope 42, preferably in the center of its field, and the number appearing at 100 recorded as the y ordinate. When this particle has been noted, the y movement knob 98 is again rotated to bring the next particle into the field, with the relative distance between these first two particles noted on the register 100 as the difference between the two readings. Alternatively by pressing the reset button 104, the counter 100 could be reset to zero after each particle is positioned, such that the number appearing on the register would be proportional to the distance between particles.

When the end of a line is reached, the knob 94 is operated to advance the slide 18 to the next y ordinate line and the process reversed. The movement can be read in the register 96. In this manner the positions of all of the particles of the track 28 can be measured and these distances manually entered into the video storage and/or spatial pattern part of the computer 36. Each time the microscope 42 was stopped on a particle, a switch could be closed independently of or synchronized with the registers 96 and 100 to enter the desired measurements into video storage or computers 36. For example, when each successive particle is centered in the microscope 42, its coordinates are entered into the computer 36 by pressing the "enter" button 103, the information being transmitted on channel 105. Suitable circuitry could readily convert x and y coordinates into spatial pattern information of the same type as the temporal pattern information derived from the particle sensing device 14 to enable the desired matching to take place.

As an alternative, the video scanner 40 may be an eyepiece in which case the technician can manually record his identification of the particle for augmenting information derived from the particle sensing device for that particle. The spatial pattern matching to temporal pattern matching can be done by computer or comparison or ordinates with the computer readout.

Many modifications and variations can be made without departing from the spirit or scope of the invention as defined in the appended claims. The principle thrust of the invention is based upon the marriage of information derived from high speed particle scanning techniques that cannot achieve one-by-one particle recognition and classification with information derived from one-by-one particle recognition and classification techniques that cannot achieve the information derived through high speed particle scanning techniques. The so-called gross physical characteristics can thus be combined with the so-called pattern or image recognition data to provide for any individual particle or particles a body of information not heretofore achieved. In medicine and biology this enables cell identification and classification to a remarkable degree.

The marriage is achieved by matching the temporal pattern of the high speed scanning with the spatial pattern of the particles as they are laid onto a substrate directly following their emergence from the sensing zone. The matching identifies each ejected particle with a particle that has been scanned by the sensing zone so that the two types of information derived can be combined. Matching can be effected by many means — manual, electronic or a combination. No limitations are intended by the described methods and apparatus.

Among the variations which can be made to the method and apparatus of the invention as indicated above are the use of particle sensing devices which are optical instead of electronic. The form of the stream 27 is also capable of assuming continuous flowing liquid instead of droplets. For example, the effluent from a particle sensing device can be in the form of a steady stream of liquid emerging from the particle sensing zone in a pipe or a pen which flows directly onto a moving substrate. This is shown in FIG. 2A where the particle scanning device 14" ejects a stream into a pen 33" in which the sensing zone may be incorporated. The pen 33" lays a line of suspension 28" onto the tape 48" carried on the support stage 22" which may be aspirating the liquid through the body of the tape. In this case, the stream of liquid is very short, being only that between the free axial end of the pen 33" and the surface of the tape 48". The dimension could be as small as capillary distances and even less where the pen actually rides the tape. In the latter case, the stream would be considered that flow occurring inside the pen between the sensing zone and the tape surface.

The line produced by such a stream would be continuous but the particles would nonetheless be spaced along the line and easily located for spatial measurement and particle recognition. Actually, the aspiration of the liquid through the substrate will leave a track of particles not materially different from one produced by a jet of droplets. Accordingly, the expression "stream of liquid" as used herein should be taken to mean a type of flux which is in the form of a steady uninterrupted liquid flow or discrete droplets or a mixture of both.

What it is desired to secure by Letters Patent of the United States is:

1. A method for obtaining information on the characteristics of particles in a liquid suspension comprising the steps of
   A. laying a stream of the suspension upon a substrate in a pattern of spaced apart particles whereby the sequence of temporal relationships between individual particles of the stream as they are being laid out determines the sequence of spatial relationships between the individual particles in the laid-out pattern;
   B. measuring the spatial relationships of the laid-out particles between individual particles for a plurality of particles to derive a first sequence of measurements;
   C. measuring at least one characteristic of each particle in the stream before it reaches the substrate and the temporal relationship of that particle with at least one other individual particle prior to laying down of the particles for a plurality of particles to derive a second sequence of measurements including both those related to temporal relationships and those related to the characteristics of the individual particles; and
   D. correlating the first sequence of measurements with the temporal relationships portion of the second sequence of measurements to identify a particular particle in the laid-out pattern with its at least one measured characteristic contained in said second sequence of measurements.

2. A method as claimed in claim 1 in which at least another characteristic of each particle of the laid-out particles is measured independently of the measurement of said at least one characteristic in addition to the measurement of spatial relationships as a portion of the first sequence of measurements whereby the indentification of each particle through said correlation of the first and second sequence of measurements provides the combination of independently obtained characteristics describing said last mentioned particle.

3. The method as claimed in claim 1 in which the stream is in the form of droplets with the particles carried in the droplets.

4. The method as claimed in claim 3 in which the dilution is made with a ratio of particles to liquid such that substantially no droplet contains more than one particle.

5. The method as claimed in claim 1 in which the substrate and stream are moved relative to one another in a movement to produce a track on the substrate.

6. The method as claimed in claim 5 in which the track is substantially rectilinear.

7. The method as claimed in claim 5 in which the track is non-rectilinear.

8. The method as claimed in claim 7 in which the track is serpentine.

9. The method as claimed in claim 2 in which the stream is in the form of droplets with the particles carried in the droplets.

10. The method as claimed in claim 9 in which the dilution is made with a ratio of particles to liquid such that substantially no droplet contains more than one particle.

11. The method as claimed in claim 2 in which the substrate and stream are moved relative to one another in a movement to produce a track on the substrate.

12. The method as claimed in claim 11 in which the track is substantially rectilinear.

13. The method as claimed in claim 11 in which the track is non-rectilinear.

14. The method as claimed in claim 13 in which the track is surpentine.

15. The method as claimed in claim 4 in which the substrate and stream are moved relative to one another in a movement to produce a track on the substrate.

16. The method as claimed in claim 15 in which the track is substantially rectilinear.

17. The method as claimed in claim 15 in which the track is non-rectilinear.

18. The method as claimed in claim 17 in which the track is serpentine.

19. The method as claimed in claim 1 in which the correlating is effected on a continuous basis as the stream is laid upon the substrate 20. The method as claimed in claim 2 in which the correlating and the measurement of said at least another characteristic are effected on a continuous basis as the stream is laid upon the substrate.

21. The method as claimed in claim 1 in which the stream is broken into droplets before being laid out, the dilution is such that substantially no droplet carries more than one particle, in which an electric charge is induced in each droplet after it is formed and the droplets are passed through an electric field prior to engaging the substrate whereby to effect a relative movement between substrate and stream.

22. The method as claimed in claim 2 in which the stream is broken into droplets before being laid out, the dilution is such that substantially no droplet carries more than one particle, in which an electric charge is induced in each droplet after it is formed and the droplets are passed through an electric field prior to engaging the substrate whereby to effect a relative movement between substrate and stream.

23. The method as claimed in claim 1 in which the liquid of the stream impinging on the substrate is removed from the substrate immediately after engagement if not simultaneously with engagement to leave the particles on the substrate substantially free of liquid.

24. The method as claimed in claim 2 in which the liquid of the stream impinging on the substrate is removed from the substrate immediately after engagement if not simultaneously with engagement to leave the particles on the substrate substantially free of liquid.

25. The method as claimed in claim 23 in which the liquid is removed by capillary action.

26. The method as claimed in claim 24 in which the liquid is removed by capillary action.

27. The method as claimed in claim 23 in which the liquid is removed by vacuum applied to the substrate, said substrate being foraminous.

28. The method as claimed in claim 24 in which the liquid is removed by vacuum applied to the substrate, said substrate being foraminous.

29. The method as claimed in claim 19 in which the correlating is effected by scanning the substrate along a viewing axis, and the viewing axis and substrate are moved relative to one another according to a movement having a known relationship with the relative movement of substrate and stream as the stream is laid on the substrate.

30. The method as claimed in claim 2 in which the correlating is effected by scanning the substrate along a viewing axis, and the viewing axis and substrate are moved relative to one another according to a movement having a known relationship with the relative movement of substrate and stream as the stream is laid on the substrate.

31. The method as claimed in claim 29 in which the known relationship is identical.

32. The method as claimed in claim 30 in which the known relationship is identical.

33. The method as claimed in claim 1 in which the one characteristic is size.

34. The method as claimed in claim 2 in which the one characteristic is size.

35. The method as claimed in claim 1 in which the particles are biological and the one characteristic is chromatic.

36. The method as claimed in claim 2 in which the particles are biological and the one characteristic is chromatic.

37. A method for identifying particles in a liquid suspension comprising the steps of:
  detecting the arrival of each of said particles in a sensing zone measuring at least a characteristic of each of said particles in said sensing zone, the sequence of said arrivals of said particles in said sensing zone having temporal relatinships which forms a first pattern,
  preserving said first pattern,
  laying said suspension upon a substrate in a second pattern, said second pattern having a spatial relationship between said particles,
  preserving the second pattern,
  scanning said second pattern with a scanning device to measure the spatial relationships between particles in said second pattern,
  correlating the temporal relationships in said first pattern with a proportionately identical pattern of spatial relationships in said second patten, and identifying each individual particle in at least a portion of said second pattern with its representative measured characteristic in said first pattern.

38. A method as described in claim 37 including the step of moving said substrate in a plane transverse to the direction of flow of suspension to form the second pattern.

39. A method as described in claim 37 including the step of:
synchronizing the motion of said scanning device with said second pattern of said particles on said substrate.

40. An apparatus for identifying particles in a liquid suspension comprising:
droplet generating means for forming droplets of the liquid suspension such that the number of droplets containing more than one particle of interest for identifying is substantially zero;
means for measuring at least one characteristic of each of said particles as said particles are passed through said measuring means, the sequence of said characteristics of said particles having a temporal relationship which forms a first pattern;
means for laying said droplets upon a substrate in a second pattern whereby the particles in said second pattern have a spatial relationship and said spatial relationship is preserved;
preserving means for preserving said first and second patterns; and
correlating means for correlating the temporal relationship in the first pattern with a sequence of the spatial relationships between particles in the second pattern to locate a sequence in said first pattern that is proportionately identical to a sequence in said second pattern such that each individual particle in at least a portion of said second pattern is matched with its said at least one measured characteristic resulting from its passage through said droplet generating means.

41. An apparatus as described in claim 40 wherein said preserving means includes a first memory device for preserving said temporal relationships in said first pattern and a second memory device for preserving the spatial relationships between particles in second pattern.

42. An apparatus as described in claim 40 wherein said means for laying said droplets include means for deflecting said droplets such that said droplets form said second pattern upon said substrate.

43. An apparatus as described in claim 42 wherein:
said deflecting means include a plurality of plates across which an electric field is produced to deflect said droplets in a first direction and a substrate mount is provided to move said substrate in a second direction so as to form said second pattern.

44. An apparatus as described in claim 43 in which there are sample preparation means and said substrate mount is arranged to pass said substrate through said sample preparation means for preparing said second pattern.

45. An apparatus as claimed in claim 43 wherein said deflecting means include:
waste means for discarding unwanted droplets not having a high probability of comprising at least a particle of interest; and
means coupled to said waste means for directing said unwanted droplets into said waste means.

46. An apparatus as described in claim 40 wherein said correlating means includes:
a microscope for viewing each individual particle in said second pattern;
scanning means coupled to said microscope for providing electrical signals representative of said second pattern as seen by said microscope;
computing means coupled to said measuring means and said scanning means for correlating the temporal relationship in said first pattern with the sequence of the spatial relationships in said second pattern, and
said computing means including means for utilizing pattern recognition techniques whereby each individual particle is accurately matched with said at least one measured charcteristic resulting from its passage through said droplet generating means.

47. An apparatus as described in claim 46 wherein said correlating means include means mounted to said microscope for guiding said microscope along said second pattern whereby each individual particle in at least a portion of said second pattern passes under said microscope.

48. An apparatus as described in claim 46 wherein said correlating means include means mounted to said substrate for guiding said substrate such that each individual particle in at least a portion of said second pattern passes under said microscope.

49. Apparatus as described in claim 46 wherein said correlating means including means for producing relative motion between said substrate and said droplet generating means such that each individual particle in at least a portion of said second pattern passes under said microscope.

50. An apparatus as described in claim 46 wherein said means for laying said droplets includes means for moving said substrate surface transverse to the direction of droplet trajectories such that said droplets are laid upon said substrate in said second pattern and suction means are provided for removing excess suspending liquid.

51. An apparatus as described in claim 50 wherein said substrate is a slide and said droplet generating means and said microscope are pivotally mounted upon a common base such that said microscope is pivoted to a position over said slide once said slide has said second pattern formed thereon; and
said means for moving said substrate coupled to move said slide such that each particle in at least a portion of said second pattern passes under said microscope.

52. Apparatus for obtaining information on the characteristics of particles in a liquid suspension which comprises:
A. a particle scanning device comprising
 i. means for containing a quantity of suspension carrying particles,
 ii. a sensing zone responding to passage of particles to produce a signal representing at least one physical characteristic of each particle for each particle passing.
 iii. means to move the suspension in a stream through the sensing zone such that the particles generate a temporal pattern and out of the particle scanning device with the particles contained in the stream and spaced along the length thereof in a spatial pattern, B. means preserving the temporal pattern and the signals with each signal indentified in said temporal pattern with the particle producing same on account of its position in the temporal pattern,
C. a substrate arranged to intercept the stream emerging from the scanning device,
D. means for effecting a relative movement between the substrate and stream in accordance with a predetermined law whereby to lay the stream down in a track upon a surface of the substrate with the particles spaced along the track with the spatial pattern preserved on the substrate surface, and
E. means for correlating the temporal pattern with the spatial pattern taking said law into account whereby to match each of the particles of the laid-down track with the preserved signals of their respective counterpart measurements made on each particle during the generation of the temporal pattern.

53. The apparatus as claimed in claim 52 in which means are provided for measuring at least a second physical characteristic of each particle on said track and combining each latter measurement with the previous measurement of said first characteristic of said each particle to acquire increased information concerning said each particle.

54. The method as claimed in claim 53 in which the liquid of the stream is substantially removed by deflecting to waste those droplets containing no particles.

* * * * *